United States Patent
Hashida

(10) Patent No.: US 11,558,430 B2
(45) Date of Patent: Jan. 17, 2023

(54) INFORMATION COLLECTION SYSTEM, INFORMATION COLLECTION METHOD, AND NON-TRANSITORY COMPUTER READABLE MEDIUM STORING CONTROL PROGRAM

(71) Applicant: NEC Corporation, Tokyo (JP)

(72) Inventor: Keisuke Hashida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 162 days.

(21) Appl. No.: 17/258,929

(22) PCT Filed: Jul. 10, 2018

(86) PCT No.: PCT/JP2018/026051
§ 371 (c)(1),
(2) Date: Jan. 8, 2021

(87) PCT Pub. No.: WO2020/012561
PCT Pub. Date: Jan. 16, 2020

(65) Prior Publication Data
US 2021/0289003 A1    Sep. 16, 2021

(51) Int. Cl.
*H04L 9/40* (2022.01)

(52) U.S. Cl.
CPC ............ *H04L 63/30* (2013.01); *H04L 63/308* (2013.01)

(58) Field of Classification Search
CPC ........... H04L 63/00; H04L 63/14–1408; H04L 63/1425; H04L 63/30–308
See application file for complete search history.

(56) References Cited

U.S. PATENT DOCUMENTS

| | | | |
|---|---|---|---|
| 6,606,653 B1 * | 8/2003 | Ackermann, Jr. | ........................... H04L 29/12009 709/203 |
| 7,624,274 B1 * | 11/2009 | Alspector | ............... H04L 51/12 380/59 |
| 2008/0313734 A1 * | 12/2008 | Rozenberg | ............. G06N 5/043 726/22 |
| 2013/0133074 A1 * | 5/2013 | Amoroso | ............ H04L 63/1408 726/25 |
| 2015/0033347 A1 | 1/2015 | Sulaiman et al. | |

FOREIGN PATENT DOCUMENTS

JP    2006-180389 A    7/2006

OTHER PUBLICATIONS

Davis, "Addressing the Challenges of Enforcing the Law on the Dark Web", S.J. Quinney College of Law (Year: 2017).*

(Continued)

*Primary Examiner* — Tauqir Hussain

(57) ABSTRACT

In an information collection system, an address posting unit posts address information of a hidden service provided by a hidden service providing system to a server serving as a posting target server. Then, the hidden service providing system provides a hidden service appropriate to a hidden service request received from a user terminal to the user terminal. After that, an information collection unit collects information (e.g., input request information, service result information, etc.) about the hidden service provided by the hidden service providing system.

4 Claims, 6 Drawing Sheets

(56) References Cited

OTHER PUBLICATIONS

Heath, "FBI ran website sharing thousands of child porn images", USA Today (Year: 2016).*
Zetter, "Use privacy services—The NSA is probably tracking you", Wired UK (Year: 2014).*
International Search Report for PCT Application No. PCT/JP2018/026051, dated Oct. 9, 2018.
Hirofumi Sou et al., "An examination on accuracy of the abusing user identification method of the tor anonymity system", 4. "Proposal technique", IPSJ SIG Technical Reports, non-official translation, Nov. 13, 2014, vol. 2014-MBL-73, No. 22, pp. 1-7, Japan.
Kaichiro Iida, Noriaki Yoshiura, "User identifying method of writing bulletin board using Tor", IEICE technical report, 4. "System", Feb. 24, 2017, vol. 116, No. 491, pp. 175-182, Japan.

\* cited by examiner

INFORMATION COLLECTION SYSTEM, INFORMATION COLLECTION METHOD, AND NON-TRANSITORY COMPUTER READABLE MEDIUM STORING CONTROL PROGRAM

This application is a National Stage Entry of PCT/JP2018/026051 filed on Jul. 10, 2018, the contents of all of which are incorporated herein by reference, in their entirety.

TECHNICAL FIELD

The present disclosure relates to an information collection system, an information collection method, and a non-transitory computer readable medium storing a control program.

BACKGROUND ART

Services such as markets and message boards that exchange illegal goods, information and the like through the Internet are a problem. For such a service through the Internet, a server and a user of the service can be identified by checking an IP address of the service, an IP address of a user device, and information of a source Internet service provider.

However, there are techniques to hide an IP address and a payload. For example, Tor (The Onion Router) is an anonymous network system that achieves anonymization of a connection path. In the Tor, a p2p network (which is also called a Tor network in some cases) composed of equipment called a relay node is constructed. Then, communication through this Tor network is performed in the Tor. In the Tor, communication is relayed by a plurality of relay nodes in the Tor network, and encryption is carried out in each of the relay nodes. Multistage encryption of communication is thereby performed in the Tor, thereby hiding information (IP address, payload, etc.) other than the immediately previous relay node on the path.

On the other hand, a technique to collect access information of a relay node and an exit node in an anonymous network system is proposed (for example, Patent Literature 1). The exit node is a node in the anonymous network system, which is connected to the outside of the anonymous network system. The technique disclosed in Patent Literature 1 blocks the access to a device outside the anonymous network system via the anonymous network system by using the collected information.

CITATION LIST

Patent Literature

PTL1: Japanese Unexamined Patent Application Publication No. 2006-180389

SUMMARY OF INVENTION

Technical Problem

In an anonymous network system, a service called a hidden service is provided. In this hidden service, both of an IP address of a user device using the hidden service and an IP address of the hidden service are not identifiable, and therefore there is a possibility that the hidden service could be used in an illegal manner. It is therefore desirable to collect information about a user using the hidden service.

However, while the technique disclosed in Patent Literature 1 is capable of collecting the IP addresses of the relay node and the exit node in the anonymous network system, there is a possibility that it cannot collect information about a user using the hidden service.

An object of the present disclosure is to provide an information collection system, an information collection method, and a non-transitory computer readable medium storing a control program capable of collecting information about a user using a hidden service.

Solution to Problem

An information collection system according to a first aspect is located in an anonymous network and includes a hidden service providing system configured to provide a hidden service appropriate to a hidden service request received from a user device through the anonymous network to the user device through the anonymous network, an information collection unit configured to collect information about the provided hidden service, and an address posting unit configured to post address information of the hidden service provided by the hidden service providing system to a posting target server located in the anonymous network and providing another hidden service.

An information collection method according to a second aspect includes posting, by an address posting unit of an information collection system located in an anonymous network, address information of a second hidden service provided by a hidden service providing system included in the information collection system to a posting target server located in the anonymous network and providing a first hidden service, providing, by the hidden service providing system, the second hidden service in response to a hidden service request transmitted from a user device by using the posted address information, and collecting, by an information collection unit in the information collection system, information about the provided second hidden service.

A control program according to a third aspect causes an information collection system located in an anonymous network to perform processing of posting address information of a second hidden service provided by the information collection system to a posting target server located in the anonymous network and providing a first hidden service, providing the second hidden service in response to a hidden service request transmitted from a user device by using the posted address information, and collecting information about the provided second hidden service.

Advantageous Effects of Invention

According to the present disclosure, there are provided an information collection system, an information collection method, and a non-transitory computer readable medium storing a control program capable of collecting information about a user using a hidden service.

DESCRIPTION OF EMBODIMENTS

Example embodiments are described hereinafter with reference to the drawings. It should be noted that, in the example embodiments, the same or equivalent elements are denoted by the same reference symbols, and the redundant explanation thereof is omitted.

First Example Embodiment

<Overview of Anonymous Network>

Figure 1:
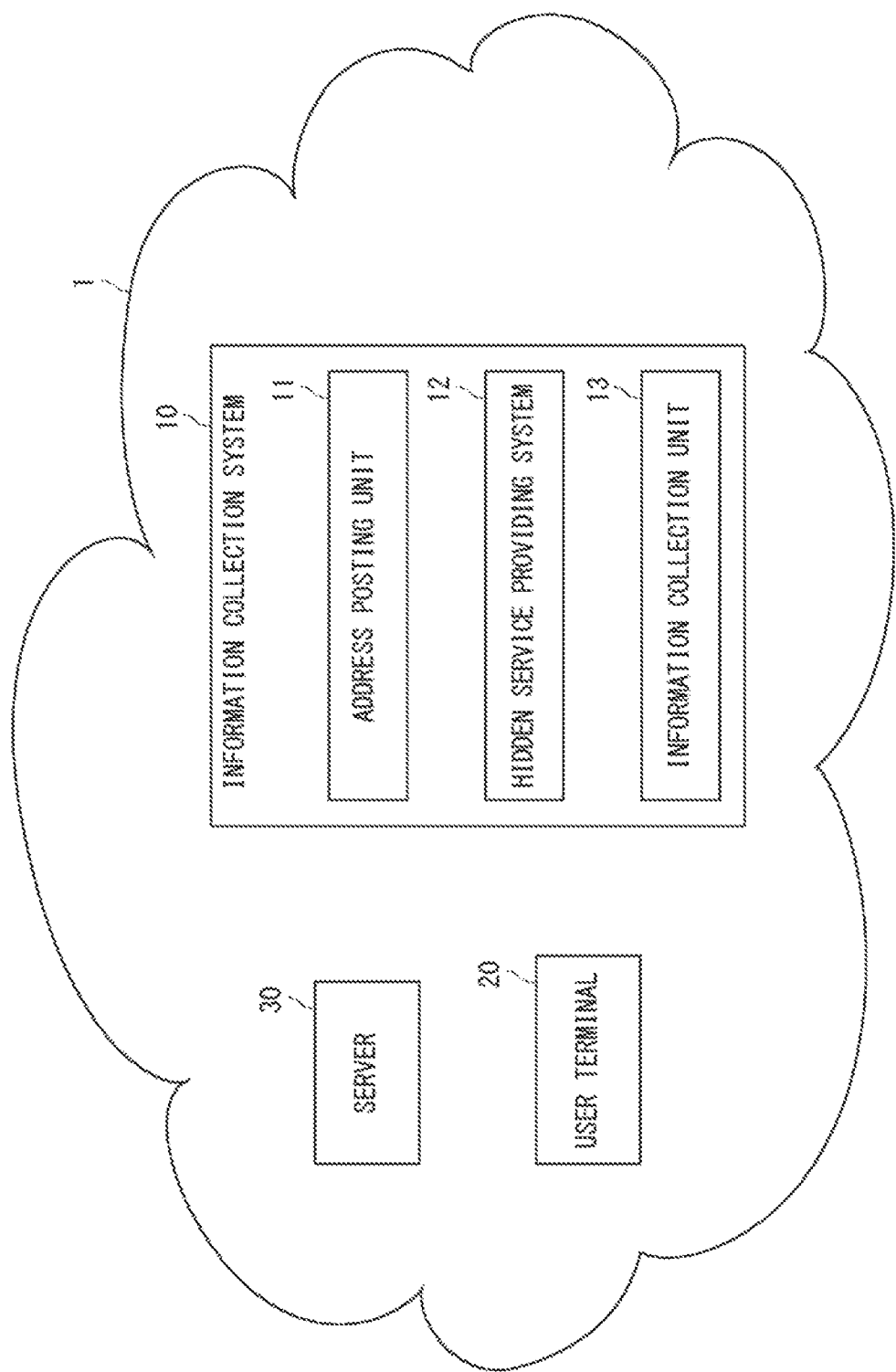
FIG. 1 is a view showing an example of an information collection system according to a first example embodiment.

FIG. 1 is a view showing an example of an information collection system according to a first example embodiment. FIG. 1 shows an information collection system 10, a user terminal 20, and a server 30. The information collection system 10, the user terminal 20, and the server 30 are located in an anonymous network 1, and each of them is a joining node that is joining the anonymous network 1. The information collection system 10, the user terminal 20, and the server 30 are connected with one another, for example, through one or more relay nodes of the anonymous network 1, though not shown in FIG. 1. The anonymous network 1 is, for example, a Tor network.

The server 30 is a server that provides a hidden service (which is referred to as a "first hidden service" in some cases below). As the first hidden service, the server 30 provides a web service such as, for example, a message board or a market.

The information collection system 10 posts, to the server 30, address information of a hidden service (which is referred to as a "second hidden service" in some cases below) provided by the information collection system 10. For example, when the first hidden service is a message board, the information collection system 10 posts address information (e.g., URL) of the second hidden service to the message board. The server 30 can be referred to as a "posting target server" since it is a server to which the information collection system 10 posts the address information of the second hidden service.

The user terminal 20 accesses the server 30 by a user operation. Then, when a user views the message board displayed on, for example, a display unit (not shown) of the user terminal 20, and becomes interested in the second hidden service, the user terminal 20, by a user operation, accesses the information collection system 10 by using the address information of the second hidden service. This induces a user of the first hidden service, which could be used in an illegal manner, to become involved in the information collection system 10.

Then, the information collection system 10 collects information (e.g., input request information, service result information, etc.) about the second hidden service provided, in response to a request from a user of the user terminal 20, by the information collection system 10. This allows collecting of information about the user of the first hidden service, which could be used in an illegal manner.

<Configuration Example of Information Collection System>

As shown in FIG. 1, the information collection system 10 includes an address posting unit 11, a hidden service providing system (hidden service providing unit) 12, an information collection unit 13.

The address posting unit 11 posts the address information of the second hidden service provided by the hidden service providing system 12 to the server 30, which is the posting target server (i.e., to the first hidden service provided by the server 30). The address posting unit 11 may change the address information of the second hidden service at regular intervals and post the changed address information to the server 30 each time it is changed. This prevents a user who is unsuitable for the information collection purpose from accessing the information collection system 10 due to the same address information being posted for a longer time than a specified period.

The hidden service providing system 12 provides, to the user terminal 20 through the anonymous network 1, the second hidden service appropriate to a "hidden service request" received from the user terminal 20 through the anonymous network 1.

The information collection unit 13 collects information (e.g., input request information, service result information, etc.) about the second hidden service provided by the hidden service providing system 12.

<Operation Example of Information Collection System>

Figure 2:
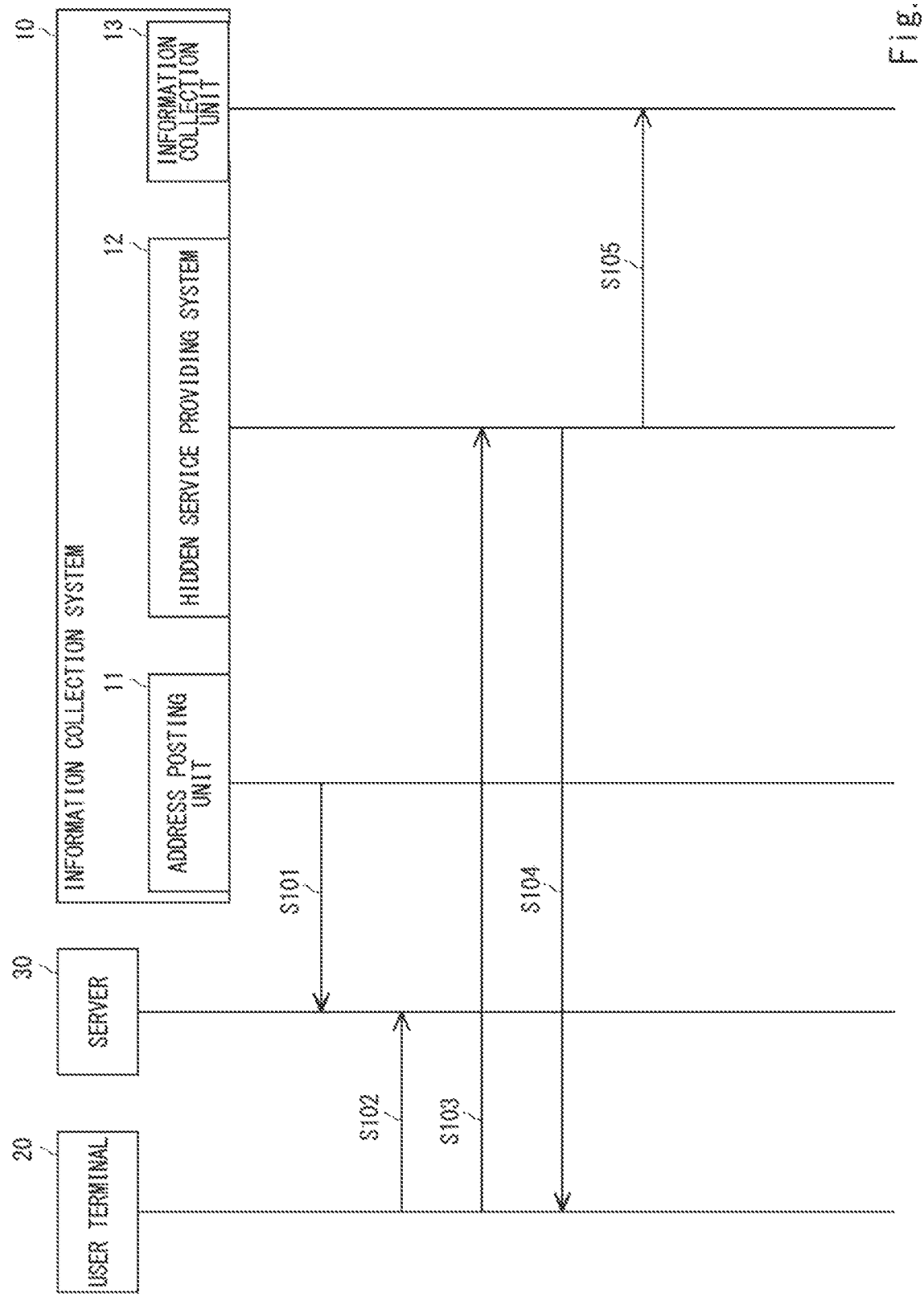
FIG. 2 is a sequence chart for describing the processing operation of the information collection system according to the first example embodiment.

An example of the processing operation of the information collection system 10 having the above configuration is described hereinafter. FIG. 2 is a sequence chart for describing the processing operation of the information collection system according to the first example embodiment. In the sequence chart of FIG. 2, exchange of information between the information collection system 10 and each of the user terminal 20 and the server 30 is also shown.

In the information collection system 10, the address posting unit 11 posts the address information of the second hidden service provided by the hidden service providing system 12 to the server 30, which is the posting target server (Step S101).

The user terminal 20 accesses the server 30 by a user operation (Step S102).

By the user operation, the user terminal 20 accesses the hidden service providing system 12 by using the address information of the second hidden service, and transmits a hidden service request to the hidden service providing system 12 (Step S103).

The hidden service providing system 12 provides the second hidden service appropriate to the hidden service request received from the user terminal 20 through the anonymous network 1 to the user terminal 20 through the anonymous network 1 (Step S104).

The information collection unit 13 collects information about the second hidden service provided by the hidden service providing system 12 (Step S105).

As described above, according to the first example embodiment, in the information collection system 10, the address posting unit 11 posts the address information of the second hidden service provided by the hidden service providing system 12 to the server 30, which is the posting target server. The hidden service providing system 12 provides the second hidden service appropriate to the "hidden service request" received from the user terminal 20 to the user terminal 20. The information collection unit 13 collects information (e.g., input request information, service result information, etc.) about the second hidden service provided by the hidden service providing system 12.

This configuration of the information collection system 10 enables inducing a user of the first hidden service, which could be used in an illegal manner, to become involved in the information collection system 10 and thereby collecting of information about the user of the first hidden service, which could be used in an illegal manner.

Further, the address posting unit 11 changes the address information of the second hidden service at regular intervals and posts the changed address information to the server 30 each time the change is made.

This configuration of the information collection system 10 prevents a user who is unsuitable for the information collection purpose from accessing the information collection system 10 due to the same address information being posted for a longer time than a specified period.

Second Example Embodiment

A second example embodiment relates to an example embodiment where an information collection system acquires a service result appropriate to a hidden service request received from a user device from a surface service server outside an anonymous network and provides it to the user device as a result of a hidden service of a hidden service providing system.

<Configuration Example of Information Collection System>

Figure 3:
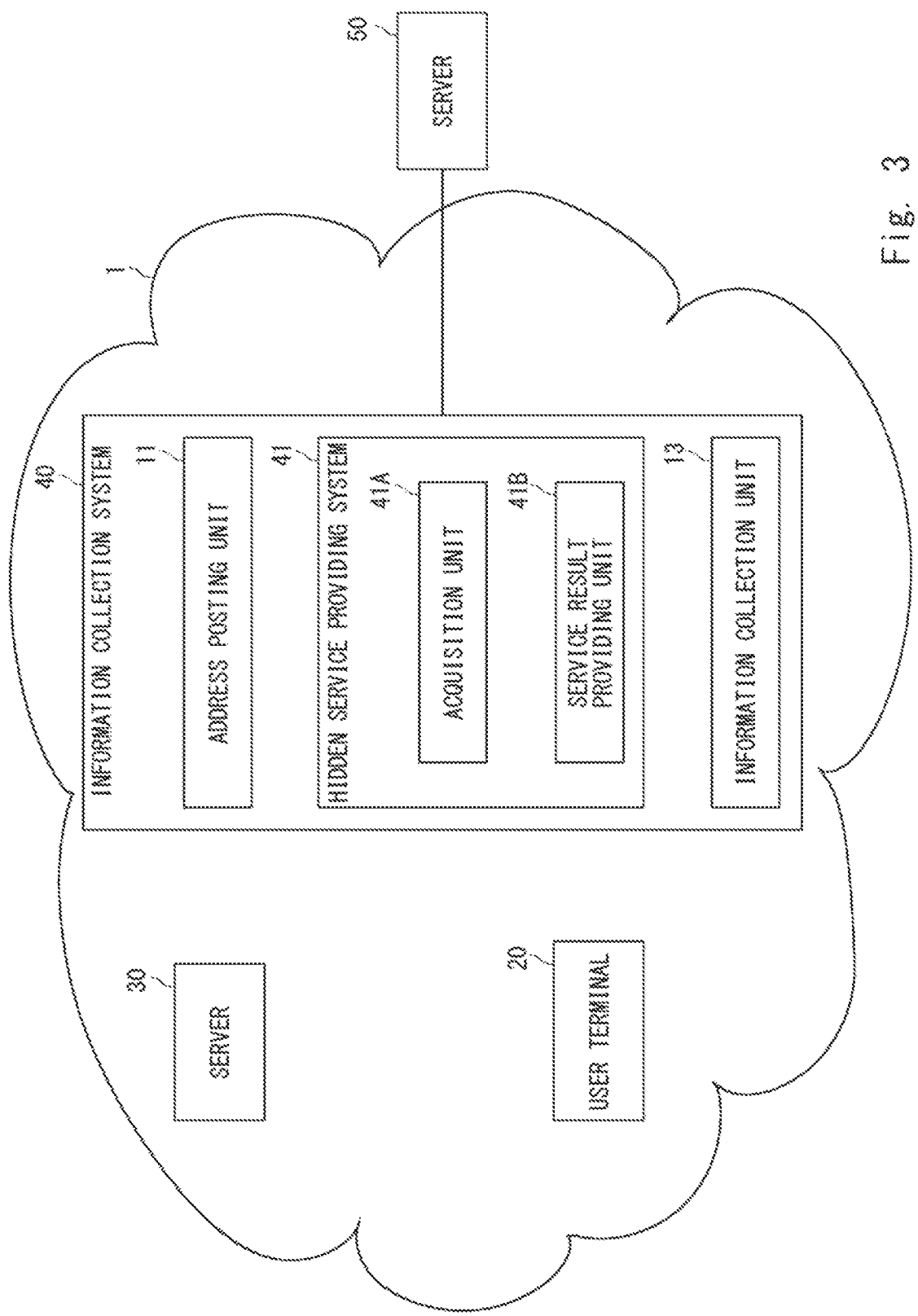
FIG. 3 is a view showing an example of an information collection system according to a second example embodiment.

FIG. 3 is a view showing an example of an information collection system according to the second example embodiment. FIG. 3 shows an information collection system 40, a user terminal 20, a server 30, and a server 50. The information collection system 40, the user terminal 20, and the server 30 are located in an anonymous network 1, and each of them is a joining node that is joining the anonymous network 1. On the other hand, the server 50 is located outside the anonymous network 1, and it is connected to the information collection system 40 through the Internet (not shown), for example.

As shown in FIG. 3, the information collection system 40 includes an address posting unit 11, an information collection unit 13, and a hidden service providing system (hidden service providing unit) 41. The hidden service providing system 41 includes an acquisition unit 41A and a service result providing unit 41B.

The acquisition unit 41A acquires, from the server 50, a service result appropriate to a "hidden service request" received from the user terminal 20. This server 50 is not a server that provides a hidden service, and it is a server that provides a service open to the public. Thus, the server 50 is a surface service server.

The service result providing unit 41B provides the service result acquired in the acquisition unit 41A to the user terminal 20 as a service result of the second hidden service of the hidden service providing system 41. In this manner, a service by a surface service server outside the anonymous network 1 is used in order to acquire a service result of a hidden service of the hidden service providing system 41. This facilitates the construction of the hidden service providing system 41 and also increases the degree of freedom of setting a hidden service of the hidden service providing system 41.

<Operation Example of Information Collection System>

Figure 4:
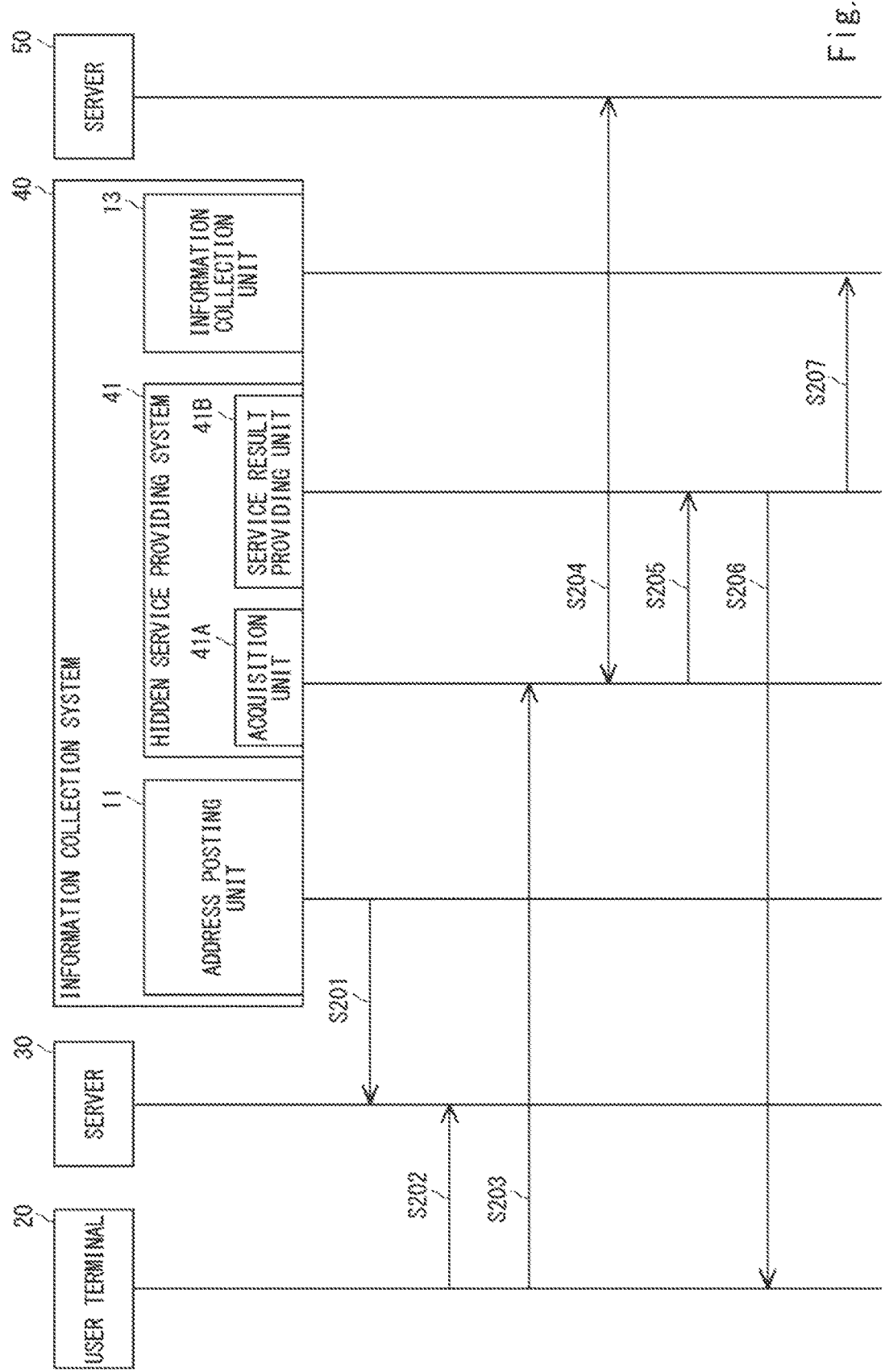
FIG. 4 is a sequence chart for describing the processing operation of the information collection system according to the second example embodiment.

An example of the processing operation of the information collection system 40 having the above configuration is described hereinafter. FIG. 4 is a sequence chart for describing the processing operation of the information collection system according to the second example embodiment. In the sequence chart of FIG. 4, exchange of information between the information collection system 40 and each of the user terminal 20, the server 30 and the server 50 is also shown.

Step S201 to Step S203 are respectively the same as Step S101 to Step S103 in FIG. 2.

In the hidden service providing system 41, the acquisition unit 41A acquires a service result appropriate to a "hidden service request" received from the user terminal 20 from the server 50 (Step S204). Then, the acquisition unit 41A sends out the acquired service result to the service result providing unit 41B (Step S205).

In the hidden service providing system 41, the service result providing unit 41B provides the service result acquired from the acquisition unit 41A to the user terminal 20 as a service result of the second hidden service of the hidden service providing system 41 (Step S206).

The information collection unit 13 collects information about the second hidden service provided by the hidden service providing system 41 (Step S207).

As described above, according to the second example embodiment, in the hidden service providing system 41 of the information collection system 40, the acquisition unit 41A acquires, from the server 50, a service result appropriate to the "hidden service request" received from the user terminal 20. The service result providing unit 41B provides the service result acquired in the acquisition unit 41A to the user terminal 20 as a service result of the second hidden service of the hidden service providing system 41.

This configuration of the information collection system 40 enables using a service by a surface service server outside the anonymous network 1 in order to acquire a service result of a hidden service of the hidden service providing system 41. This facilitates the construction of the hidden service providing system 41 and also increases the degree of freedom of setting a hidden service of the hidden service providing system 41.

Third Example Embodiment

A third example embodiment relates to a more specific example embodiment.

<Configuration Example of Information Collection System>

Figure 5:
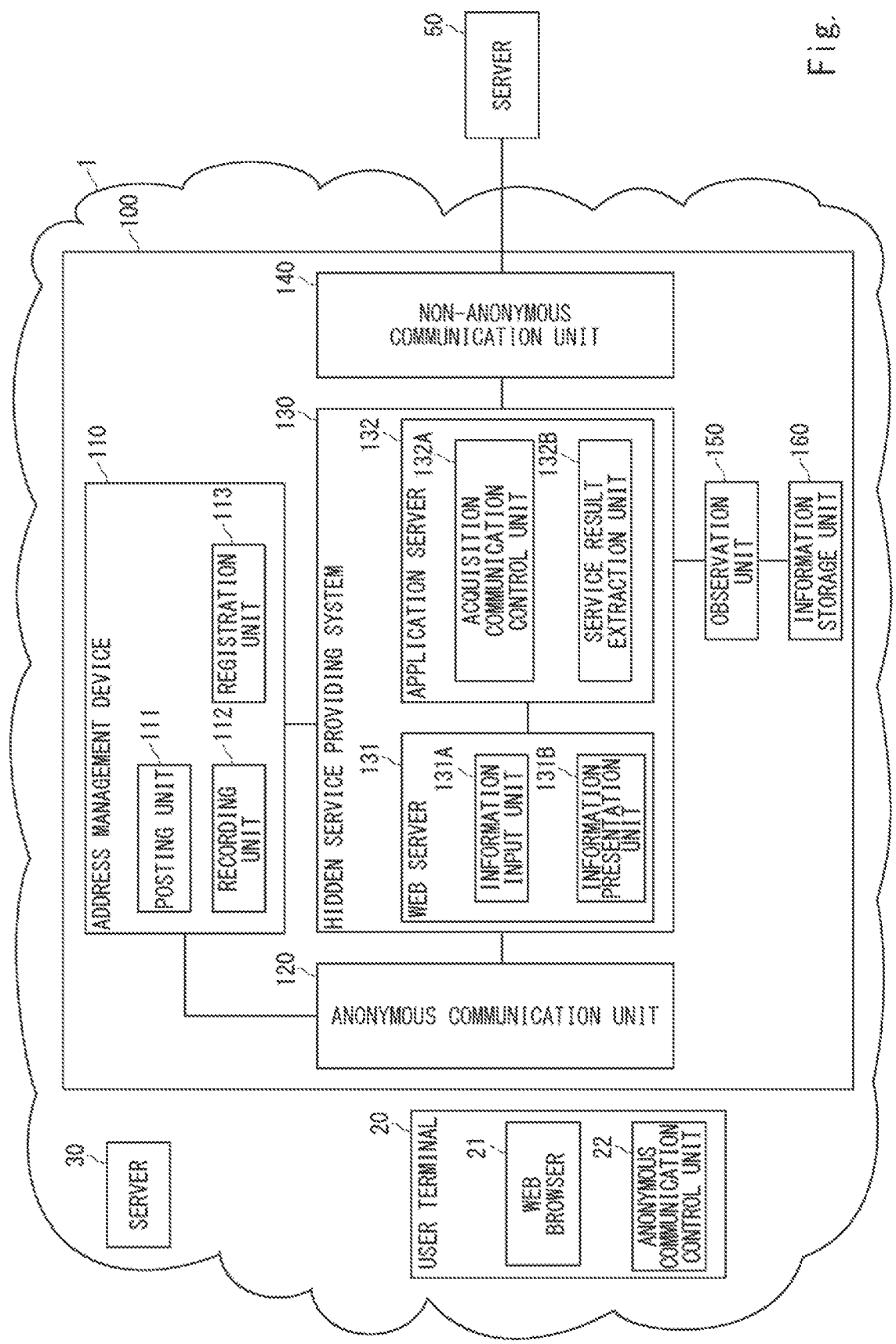
FIG. 5 is a view showing an example of an information collection system according to a third example embodiment.

FIG. 5 is a view showing an example of an information collection system according to the third example embodiment. FIG. 5 shows an information collection system 100, and also shows a user terminal 20, a server 30, and a server 50 just like in FIG. 3 of the second example embodiment. In the following example, it is assumed that the anonymous network 1 is a Tor network. In this case, the anonymous network 1 is a wide area network constructed by Tor software.

The information collection system 100, the user terminal 20, and the server 30 are located in an anonymous network 1, and each of them is a joining node that is joining the anonymous network 1. The server 50 is located outside the anonymous network 1, and it is connected to the information collection system 100 through the Internet (not shown), for example. In FIG. 5, the user terminal 20 includes a web browser 21 and an anonymous communication control unit 22. The web browser 21 is a web browser for using a hidden service (including a first hidden service and a second hidden service). The web browser 21 sends out a hidden service request (e.g., http request) to the anonymous communication control unit 22. At this point of time, the hidden service request is plain text. The anonymous communication control unit 22 is a functional unit that controls anonymous communication between the user terminal 20 and each of the server 30 and the information collection system 100 through the anonymous network 1, and it operates by Tor software. The anonymous communication control unit 22 encrypts and anonymizes the hidden service request (e.g., http request) received from the web browser 21, and sends out the encrypted and anonymized hidden service request to the information collection system 100.

As shown in FIG. 5, the information collection system 100 includes an address management device 110, an anonymous communication unit 120, a hidden service providing system 130, a non-anonymous communication unit 140, an observation unit 150, and an information storage unit 160. The address management device 110, the anonymous communication unit 120, the hidden service providing system 130, the non-anonymous communication unit 140, the observation unit 150, and the information storage unit 160 are connected for communication with one another by using an appropriate communication method.

The address management device 110 includes a posting unit 111, a recording unit 112, and a registration unit 113.

The posting unit 111 corresponds to the address posting unit 11 described in the first example embodiment and the second example embodiment. The posting unit 111 controls the generation, posting, and update (change) of the address information of the second hidden service provided by the hidden service providing system 130. The address information generated or updated in the posting unit 111 is transmitted by the anonymous communication unit 120, which is described later, to the server 30 through the anonymous network 1 and thereby posted to the server 30. The posting unit 111 may perform the posting of the address information to the server 30 automatically according to a script or the like, or on a timely basis according to operation by an administrator of the information collection system 100.

The recording unit 112 records the operating period of the address information and also records the operational status of the second hidden service in the operating period.

The registration unit 113 registers the second hidden service on the anonymous network 1 each time the address information of the second hidden service provided by the hidden service providing system 130 is updated. This allows the second hidden service to remain available even when the address information of the second hidden service is updated.

The anonymous communication unit 120 functions as an interface with the anonymous network 1. The anonymous communication unit 120 operates according to Tor software, for example. For example, the anonymous communication unit 120 performs reception processing such as decoding on a signal received through the anonymous network 1, and sends out the signal after the reception processing to the hidden service providing system 130. Further, the anonymous communication unit 120 performs transmission processing such as encryption and anonymization on a signal received from each functional unit of the information collection system 100, and sends out the signal after the transmission processing to the anonymous network 1.

The hidden service providing system 130 includes a web server 131 and an application server 132.

The web server 131 includes an information input unit 131A and an information presentation unit 131B. The web server 131 operates by web server software such as Apache or nginx, for example.

The information input unit 131A receives the hidden service request (e.g., http request) transmitted from the user terminal 20 through the anonymous communication unit 120, and forms a "server request" by using "input information" contained in this hidden service request. Then, the information input unit 131A sends out the formed server request to the application server 132.

The information presentation unit 131B receives a "server response" containing a service result acquired from the server 50 by the application server 132 that has received the server request, and forms an "http response" by using the service result contained in this the server response. This http response contains the service result. Then, the information presentation unit 131B transmits the formed http response to the user terminal 20 through the anonymous communication unit 120. The service result acquired from the server 50 is thereby provided to the user terminal 20 as a service result of the hidden service providing system 130. Thus, the information presentation unit 131B corresponds to the service result providing unit 41B in the second example embodiment.

The application server 132 includes an acquisition communication control unit 132A and a service result extraction unit 132B.

The acquisition communication control unit 132A receives a server request sent out from the information input unit 131A, and forms an http request for the server 50 by using this server request. Then, the acquisition communication control unit 132A transmits the formed http request to the server 50 through the non-anonymous communication unit 140, which is described later. The server 50 that has received the http request thereby executes a service by using the input information contained in the http request, and sends an http response containing the obtained service result back to the information collection system 100.

The service result extraction unit 132B receives, through the non-anonymous communication unit 140, the http response transmitted from the server 50 and extracts the service result from this http response. Then, the service result extraction unit 132B forms a server response containing the extracted service result and sends out the formed server response to the information presentation unit 131B. In this manner, the information input unit 131A, the acquisition communication control unit 132A, and the service result extraction unit 132B acquire the service result appropriate to the hidden service request received from the user terminal 20, and they correspond to the acquisition unit 41A in the second example embodiment.

The non-anonymous communication unit 140 functions as an interface with the Internet.

The observation unit 150 monitors each functional unit of the information collection system 100 and thereby observes the activity of a user of the user terminal 20. The observation unit 150 observes information before and after conversion by the anonymous communication unit 120, for example, in addition to the input information and the service result. Thus, the observation unit 150 corresponds to the information collection unit 13 in the first example embodiment and the second example embodiment.

The information storage unit 160 records the information observed by the observation unit 150.

<Operation Example of Information Collection System>

An example of the processing operation of the information collection system 100 having the above configuration is described hereinafter. The processing operation of the address management device 110 is particularly described below.

In the address management device 110, the posting unit 111 generates a URL of the second hidden service provided by the hidden service providing system 130. For example, the posting unit 111 generates a private key and a public key by RSA-1024 in conformity to the Tor specification, and generates a hash by sha1 based on the generated public key. The posting unit 111 then adds ".onion" to the generated hash and thereby generates the URL of the second hidden service.

Next, the recording unit 112 records the URL generated by the posting unit 111. In addition to the URL generated by the posting unit 111, the recording unit 112 may record the public key and the private key used for the generation of the URL, and the generation time and date. The information recorded by the recording unit 112 can be used for the management of the accessible period of the second hidden service.

Then, the registration unit 113 registers the second hidden service on the anonymous network 1 by using the URL generated by the posting unit 111. The user terminal 20 of the user is thereby allowed to connect to the second hidden service. This registration processing by the registration unit 113 is performed through the anonymous communication unit 120.

After that, the posting unit 111 posts the generated URL to the server 30.

Another Example Embodiment

<1> Each of the information collection system 10, 40 and 100 described in the first to third example embodiments may be implemented by one device. Alternatively, a plurality of components of the information collection system 10, 40 and 100 may be classified into a plurality of combinations where each combination is composed of one or a plurality of arbitrary components, and each of the information collection system 10, 40 and 100 described in the first to third example embodiments may be composed of a plurality of devices respectively including the plurality of combinations.

Figure 6:
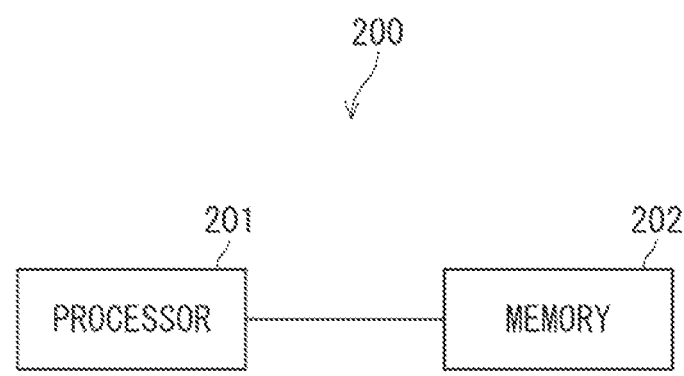
FIG. 6 is a view showing a hardware configuration example of an information collection system.

<2> FIG. 6 is a view showing a hardware configuration example of an information collection system. In FIG. 6, an information collection system 200 includes a processor 201 and a memory 202. When each of the information collection system 10, 40 and 100 described in the first to third example embodiments is implemented by one device, the information collection system 10, 40, 100 may have the hardware configuration shown in FIG. 6. The address posting unit 11, the address management device 110, the hidden service providing system (hidden service providing unit) 12, 41, 130, the information collection unit 13, and the observation unit 150 in the information collection system 10, 40, 100 may be implemented by reading and executing, by the processor 201, a program stored in the memory 202. The program may be stored using various types of non-transitory computer readable media and supplied to the information collection system 10, 40, 100. Alternatively, the program may be supplied to the information collection system 10, 40, 100 by various types of transitory computer readable media.

REFERENCE SIGNS LIST

1 ANONYMOUS NETWORK
10,40 INFORMATION COLLECTION SYSTEM
11 ADDRESS POSTING UNIT
12,41,130 HIDDEN SERVICE PROVIDING SYSTEM (HIDDEN SERVICE PROVIDING UNIT)
13 INFORMATION COLLECTION UNIT
20 USER TERMINAL
21 WEB BROWSER
22 ANONYMOUS COMMUNICATION CONTROL UNIT
30 SERVER
41A ACQUISITION UNIT
41B SERVICE RESULT PROVIDING UNIT
50 SERVER
100 INFORMATION COLLECTION SYSTEM
110 ADDRESS MANAGEMENT DEVICE
111 POSTING UNIT
112 RECORDING UNIT
113 REGISTRATION UNIT
120 ANONYMOUS COMMUNICATION UNIT
131 WEB SERVER
131A INFORMATION INPUT UNIT
131B INFORMATION PRESENTATION UNIT
132 APPLICATION SERVER
132A ACQUISITION COMMUNICATION CONTROL UNIT
132B SERVICE RESULT EXTRACTION UNIT
140 NON-ANONYMOUS COMMUNICATION UNIT
150 OBSERVATION UNIT
160 INFORMATION STORAGE UNIT

What is claimed is:

1. An information collection system located in an anonymous network, comprising:
   hardware including at least one processor and at least one memory; and
   a hidden service providing system implemented at least by the hardware and that provides a hidden service appropriate to a hidden service request received from a user device through the anonymous network to the user device through the anonymous network;
   an information collection unit implemented at least by the hardware and that collects information about the provided hidden service; and
   an address posting unit implemented at least by the hardware and that posts address information of the hidden service provided by the hidden service providing system to a posting target server located in the anonymous network and providing another hidden service, wherein
   the hidden service providing system comprises:
   an acquisition unit implemented at least by the hardware and configured to acquire a service result appropriate to the hidden service request received from the user device from a surface service server outside the anonymous network; and
   a service result providing unit implemented at least by the hardware and configured to provide the acquired service result to the user device as a result by the hidden service of the hidden service providing system.

2. The information collection system according to claim 1, wherein the address posting unit changes the address information of the hidden service providing system at regular intervals and posts the changed address information of the hidden service providing system to the posting target server each of a plurality of times a change is made.

3. An information collection method comprising:
   posting, by an address posting unit of an information collection system located in an anonymous network and implemented using hardware including at least one processor and at least one memory, address information of a second hidden service provided by a hidden service providing system included in the information collection system to a posting target server located in the anonymous network and providing a first hidden service;
   providing, by the hidden service providing system, the second hidden service in response to a hidden service request transmitted from a user device by using the posted address information; and collecting, by an information collection unit in the information collection system and implemented using the hardware, information about the provided second hidden service, wherein the providing includes acquiring a service result appropriate to the hidden service request received from the user device from a surface service server outside the anonymous network; and providing the acquired service result to the user device as a result by the hidden service of the hidden service providing system.

4. A non-transitory computer readable medium storing a control program causing an information collection system located in an anonymous network to perform processing of:

posting address information of a second hidden service provided by the information collection system to a posting target server located in the anonymous network and providing a first hidden service;

providing the second hidden service in response to a hidden service request transmitted from a user device by using the posted address information; and collecting information about the provided second hidden service, wherein the providing includes acquiring a service result appropriate to the hidden service request received from the user device from a surface service server outside the anonymous network; and providing the acquired service result to the user device as a result by the hidden service of the hidden service providing system.

\* \* \* \* \*